US011080303B2

(12) United States Patent
Yadav et al.

(10) Patent No.: US 11,080,303 B2
(45) Date of Patent: Aug. 3, 2021

(54) SYSTEM AND METHOD OF MULTIPROTOCOL PUBLISHER AND SUBSCRIBER SERVICES

(71) Applicant: Bank of America Corporation, Charlotte, NC (US)

(72) Inventors: Sanjay Yadav, Wilmington, DE (US); Prashant Rathi, West Chester, PA (US)

(73) Assignee: Bank of America Corporation, Charlotte, NC (US)

( * ) Notice: Subject to any disclaimer, the term of this patent is extended or adjusted under 35 U.S.C. 154(b) by 772 days.

(21) Appl. No.: 15/699,640

(22) Filed: Sep. 8, 2017

(65) Prior Publication Data

US 2019/0079989 A1   Mar. 14, 2019

(51) Int. Cl.
*G06F 16/28* (2019.01)
*G06F 16/2455* (2019.01)

(52) U.S. Cl.
CPC ........ *G06F 16/285* (2019.01); *G06F 16/2455* (2019.01); *G06F 16/24568* (2019.01)

(58) Field of Classification Search
CPC ............. G06F 16/285; G06F 16/24568; G06F 16/2455
USPC ....................................................... 707/737
See application file for complete search history.

(56) References Cited

U.S. PATENT DOCUMENTS

| | | | | |
|---|---|---|---|---|
| 6,963,572 B1 * | 11/2005 | Carr | .................... | H04L 49/3081 370/401 |
| 7,948,977 B2 * | 5/2011 | Bennett | ................. | H04L 63/145 370/389 |
| 8,381,224 B2 | 2/2013 | Huetter | | |
| 8,929,391 B2 * | 1/2015 | Smith | .................... | H04L 49/351 370/466 |
| 9,225,638 B2 * | 12/2015 | Jain | .......................... | H04L 67/10 |
| 9,842,012 B1 * | 12/2017 | Stott | ...................... | G06F 40/174 |
| 10,757,154 B1 * | 8/2020 | Jacobs | ................. | G06Q 40/025 |
| 10,776,355 B1 * | 9/2020 | Batsakis | ........... | G06F 16/24539 |
| 2002/0198840 A1 * | 12/2002 | Banka | ..................... | H04L 67/16 705/50 |

(Continued)

OTHER PUBLICATIONS

Esposito, Christian, et al. "A knowledge-based platform for Big Data analytics based on publish/subscribe services and stream processing." Knowledge-Based Systems 79 (2015): 3-17. (Year: 2015).*

*Primary Examiner* — Mohsen Almani
(74) *Attorney, Agent, or Firm* — Michael A. Springs

(57) ABSTRACT

In one or more embodiments, one or more systems, methods, and/or processes may receive, from first computer systems, data sets via a first different data encapsulations; obtain the data sets from the first different data encapsulations; produce second different data encapsulations that include the data sets; and provide the second different data encapsulations that include the data sets to second computer systems that subscribed to receive the data sets. In one or more embodiments, the data sets may be included in one or more data streams. In one or more embodiments, the one or more systems, methods, and/or processes may store at least two of the data sets. For example, at least two of the data sets may be stored until they are requested by one or more computer systems. In one or more embodiments, one of the data sets may be duplicated and provided to multiple computer systems.

20 Claims, 7 Drawing Sheets

(56) References Cited

U.S. PATENT DOCUMENTS

| | | | |
|---|---|---|---|
| 2004/0015366 A1* | 1/2004 | Wiseman | G06F 16/258 |
| | | | 705/1.1 |
| 2004/0254993 A1* | 12/2004 | Mamas | H04L 69/329 |
| | | | 709/206 |
| 2005/0259689 A1* | 11/2005 | Bestavros | H04L 47/10 |
| | | | 370/477 |
| 2006/0106941 A1* | 5/2006 | Singhal | H04L 67/2823 |
| | | | 709/238 |
| 2010/0103837 A1* | 4/2010 | Jungck | H04L 63/0227 |
| | | | 370/252 |
| 2013/0086245 A1* | 4/2013 | Lu | G06F 1/3212 |
| | | | 709/223 |
| 2014/0086253 A1* | 3/2014 | Yong | H04L 45/50 |
| | | | 370/395.53 |
| 2014/0280142 A1* | 9/2014 | Wasson | G06F 16/2465 |
| | | | 707/737 |
| 2016/0098307 A1* | 4/2016 | Bora | G06F 16/84 |
| | | | 719/313 |
| 2016/0248670 A1* | 8/2016 | Gross, IV | H04L 45/74 |
| 2017/0163734 A1* | 6/2017 | Basu | H04L 67/12 |
| 2018/0176037 A1* | 6/2018 | Maes | H04L 43/04 |
| 2018/0205596 A1* | 7/2018 | Chu | H04L 41/0659 |

\* cited by examiner

SYSTEM AND METHOD OF MULTIPROTOCOL PUBLISHER AND SUBSCRIBER SERVICES

TECHNICAL FIELD

Certain embodiments of this disclosure relate generally to distributed computing.

BACKGROUND

Networks allow users to access various types of computing resources, which may include hardware resources and/or software resources. Examples of hardware resources include computer networks, servers, memory, and so on. Examples of software resources include applications, services, data, and so on. The computing resources may be used to process transactions. Data stores and databases can support various data types including traditional file, video, images, etc. within a name space leading to new opportunities and innovations. These data stores can have virtually unlimited storage capacity with extremely high durability and availability along with low costs leading to widespread adoption.

SUMMARY

In one or more embodiments, one or more systems, methods, and/or processes may implement a communication system among associated interacting applications of data producing and/or data processing systems. For example, the communication system may bridge and/or route various communications protocols. For instance, the communication system may receive data from a first data producing and/or data processing system via a first protocol, may route the data to a second data producing and/or data processing system, and may provide the data to the second data producing and/or data processing system via a second protocol. In this fashion, one or more advantages may be realized and/or achieved by according applications of data producing and/or data processing systems that utilize heterogeneous communications protocols with a communication medium that may permit data communications, according to one or more embodiments. For example, these one or more advantages may promote flexibility and/or agility with applications of data producing and/or data processing systems in their communications.

In one or more embodiments, the one or more systems, methods, and/or processes may receive, from first computer systems, data sets via a first different data encapsulations; obtain the data sets from the first different data encapsulations; produce second different data encapsulations that include the data sets; and provide the second different data encapsulations that include the data sets to second computer systems that subscribed to receive the data sets. In one or more embodiments, the data sets may be included in a one or more data streams. In one or more embodiments, the one or more systems, methods, and/or processes may store at least two of the data sets. For example, the at least two of the data sets may be provided to at least one of the second computer systems after an amount of time transpires.

In one or more embodiments, at least one of the second different data encapsulations may include a duplicated data set. For example, the one or more systems, methods, and/or processes may duplicate at least one of the data sets. In one or more embodiments, producing the second different data encapsulations that include the data sets may include producing a first data encapsulation of the second different data encapsulations that includes the at least one of the data sets and producing a second data encapsulation, different from the first data encapsulation, of the second different data encapsulations that includes the duplicated data set. In one or more embodiments, providing the second different data encapsulations that include the data sets to the second computer systems may include providing first data encapsulation of the second different data encapsulations that includes the at least one of the data sets to a first computer system of the second computer systems and providing the second data encapsulation, different from the first data encapsulation, of the second different data encapsulations that includes the duplicated data set. In one or more embodiments, the one or more systems, methods, and/or processes may receive at least one request for at least one of the second different data encapsulations.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
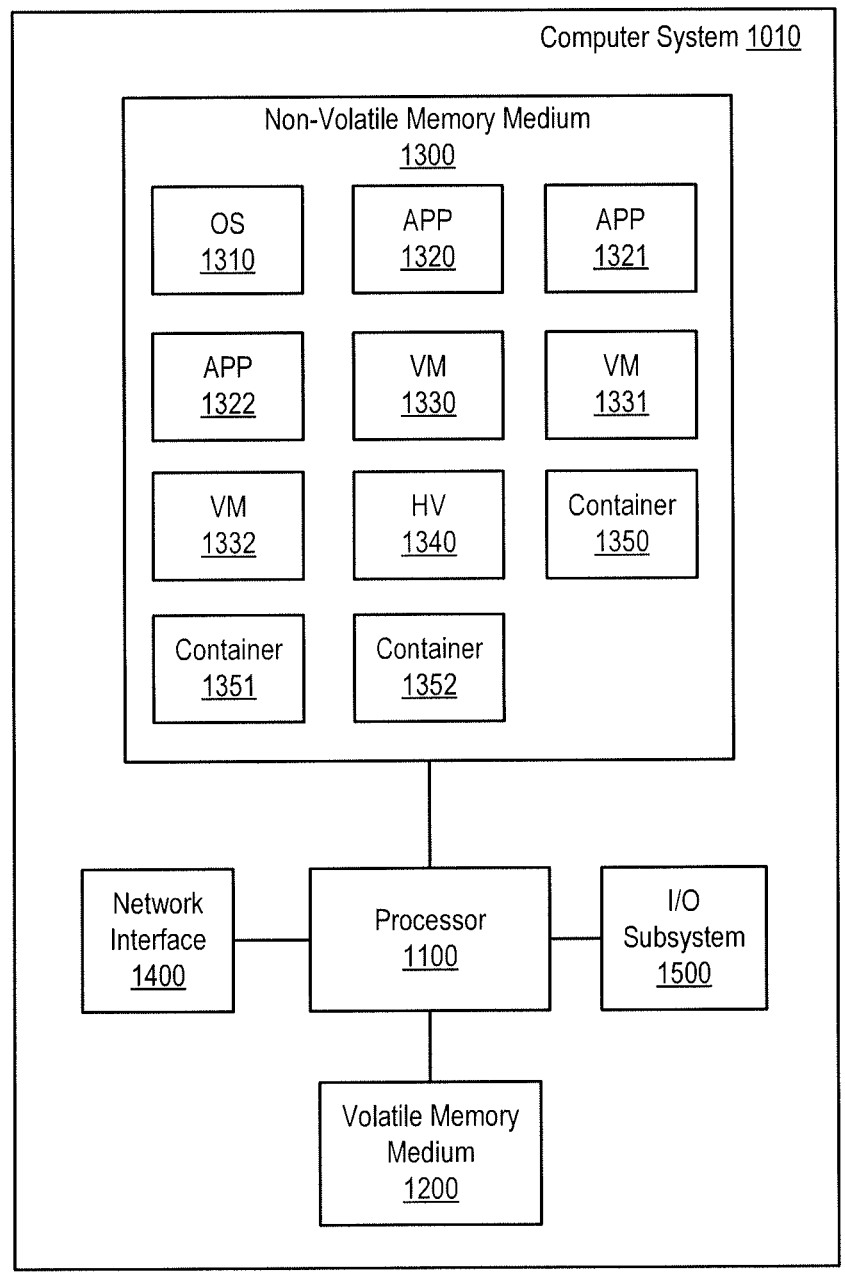
FIG. 1 illustrates an example of a computer system, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral followed by a letter refers to a specific instance of an element and the numeral only form of the reference numeral refers to the collective element. Thus, for example, device '12A' refers to an instance of a device class, which may be referred to collectively as devices '12' and any one of which may be referred to generically as a device '12'.

In one or more embodiments, data may be streamed from one or more computer systems to one or more other computer systems. For example, two or more computer systems may utilize different communications protocols to stream data and/or receive data. For instance, a communication system may bridge, route, and/or translate various communications protocols, such that computer systems utilizing different communications protocols may communicate with one another.

In one or more embodiments, a data stream may include multiple data sets. For example, a data set may include a data structure that includes data of a data stream. In one or more embodiments, multiple data sets may be encapsulated via multiple data encapsulations. In one example, encapsulation may include a method and/or a process of modular data communication, which may logically separate data from underlying structures. In another example, during encapsulation, a protocol data unit (PDU) may be created and/or implemented by adding a header and/or a trailer that may include control information to the PDU. For instance, contents of a web page may be encapsulated with a hypertext transfer protocol (HTTP) header.

In one or more embodiments, a data encapsulation may be provided to a destination computer system as a stream of bits, where the data encapsulation may be de-capsulated to retrieve and/or obtain data that was encapsulated (e.g., retrieve and/or obtain data a data set that was encapsulated). For example, a first computer system may encapsulate a data set via a data encapsulation and may provide the data encapsulation to a second computer system, and the second computer system may de-capsulate the data encapsulation to retrieve and/or obtain the data set that was encapsulated. For instance, the first computer system may provide the data encapsulation to the second computer system via a network. In one or more embodiments, one or more data encapsulations may be utilized. For example, the one or more data encapsulations may include one or more of a MQ (e.g., IBM MQ) data encapsulation, an Apache Spark data encapsulation, an Apache Kafka data encapsulation, and a custom data encapsulation, among others. In one instance, one or more local and/or native libraries may be utilized in producing the one or more data encapsulations. In another instance, configuration entries may be utilized in producing the one or more data encapsulations. In one or more embodiments, a data encapsulation may validate data of the data encapsulation. For example, one or more data encapsulation methods and/or processes may validate data provided to the data encapsulation methods and/or processes. In one or more embodiments, a data encapsulation may include or be included in an application programming interface (API). For example, the Apache Spark data encapsulation may provide an API that includes a data structure. For instance, the data structure may include a resilient distributed dataset (RDD), which may be or include a read-only multiset of data items that may be distributed via multiple computer systems.

In one or more embodiments, data encapsulation may be utilized as a component in a service-oriented architecture (SOA) strategy. For example, data encapsulation may provide a universal data exchange and/or messaging backbone across multiple different platforms and/or multiple different operating systems. For instance, a growing importance of SOA with a growth of services and other connectivity mechanisms may be important for technological developments. In one or more embodiments, a loosely coupled nature of utilized data encapsulation may provide, may enhance, and/or may extend SOA principles.

In one or more embodiments, one or more computer systems may subscribe to one or more data streams and/or data feeds. For example, a subscription to a data stream and/or data feed may include a computer system receiving data sets of and/or associated with the data stream and/or the data feed. In one or more embodiments, a data set may be encapsulated via a data encapsulation. For example, the data encapsulation may format and/or organize data of the data set. In one instance, the data encapsulation may format and/or organize data of the data set in a format and/or organization that is established and/or expected by a computer system receiving and/or providing the data encapsulation that includes the data set. In another instance, the data encapsulation may format and/or organize data of the data set in a format and/or organization that is utilizable by a computer system receiving and/or providing the data encapsulation that includes the data set.

In one or more embodiments, utilizing data encapsulations via a publisher/subscriber system, a communication system between or among mutually interacting software applications in a SOA may be achieved and/or implemented.

For example, a client-server model may be implemented with a service bus. For instance, a computer system may include and/or implement the service bus. In one or more embodiments, any application utilizing the service bus may behave as server and/or client. For example, utilizing data encapsulations via a publisher/subscriber system may provide data encapsulation translation between or among applications of computer systems, may direct and/or may route data sets between or among applications of computer systems, may reduce redundant services and/or redundant data set publications, and/or may control and/or may monitor the directing and/or routing the data sets between or among applications of computer systems, among others. For instance, utilizing data encapsulations via the publisher/subscriber system may promote agility and/or flexibility with regard communications between or among applications of computer systems.

Turning now to FIG. 1, an example of a computer system is illustrated, according to one or more embodiments. As shown, a computer system 1010 may include a processor 1100, a volatile memory medium 1200, a non-volatile memory medium 1300, a network interface 1400, and an input/output (I/O) subsystem 1500. As illustrated, volatile memory medium 1200, non-volatile memory medium 1300, network interface 1400, and I/O subsystem 1500 may be communicatively coupled to processor 1100.

As shown, non-volatile memory medium 1300 may include an operating system (OS) 1310, applications (APPs) 1320-1322, virtual machines (VMs) 1330-1332, a hypervisor (HV) 1340, and containers 1350-1352. In one or more embodiments, one or more of OS 1310, APPs 1320-1322, VMs 1330-1332, HV 1340, and containers 1350-1352 may include instructions executable by processor 1100. In one example, processor 1100 may execute instructions of one or more of OS 1310, APPs 1320-1322, VMs 1330-1332, HV 1340, and containers 1350-1352 via non-volatile memory medium 1300. In another example, one or more portions of the instructions of the one or more of OS 1310, APPs 1320-1332, VMs 1330-1332, HV 1340, and containers 1350-1352 may be transferred to volatile memory medium 1200, and processor 1100 may execute the one or more portions of the instructions of the one or more of OS 1310, APPs 1320-1332, VMs 1330-1332, HV 1340, and containers 1350-1352 via volatile memory medium 1200.

In one or more embodiments, HV 1340 may include one or more of software, firmware, and hardware that creates and executes one or more VMs (e.g., one or more of VMs 1330-1332). For example, computer system 1010 may be considered host machine when HV 1340 executes and one or more of VMs 1330-1332 are executed via HV 1340. For instance, a virtual machine (VM) (e.g., a VM of VMs 1330-1332) may be considered a guest machine. In one or more embodiments, a VM may provide one or more structures and/or functionalities as those described with reference to computer system 1010 (e.g., singularly or via nesting of hypervisors and virtual machines). In one example, the VM may provide emulated devices to a guest OS that executes via the VM. In another example, the VM may provide hardware devices to the guest OS that executes via the VM. In one instance, the guest OS may access hardware in a pass-through configuration. In another instance, the guest OS may access hardware in a single root input/output virtualization (SR-IOV) configuration. In one or more embodiments, guest operating systems may share one or more devices of a host machine. For example, the guest operating systems may share one or more of a network adapter via virtual network adapters and a storage device via a virtual storage devices (e.g., virtual disks, virtual memory, etc.), among others.

In one or more embodiments, OS level virtualization may be utilized. For example, OS level virtualization may include a kernel of an OS that permits multiple isolated user space instances of collections of processes (e.g., programs, applications, services, etc.). For instance, these instances are often referred to as "containers", "software containers", "virtualization engines", or "jails" (e.g., FreeBSD jails, chroot jails, etc.). In one or more embodiments, with OS level virtualization, an OS may behave and/or may appear like multiple different, individual computer systems. For example, little to no overhead may be imposed by OS level virtualization, as processes in OS level virtual partitions may utilize a single system call interface of an OS. For instance, OS level virtual partitions may not be subjected to emulation or be executed via virtual machines. In one or more embodiments, OS level virtualization may be utilized in consolidating computer system hardware or virtual machines by moving services on separate hosts or virtual machines into containers on a computer system or single virtual machine.

In one or more embodiments, a container may be or include software in a file system that includes one or more of instructions executable by a processor (e.g., a program, software, an application, server software, a service, etc.), one or more runtime libraries, one or more system tools, and one or more system libraries, among others. For example, a container may be or include a Docker container, a LXC, or a Kubernetes pod, among others. In one or more embodiments, a container may provide and/or may implement operating system-level virtualization via a virtual environment that includes a separate process space and/or a separate network space, rather than creating and/or implementing a virtual machine.

In one or more embodiments, a container may be or include a pod (e.g., a Kubernetes pod). For example, a pod may provide and/or add a higher level of abstraction to one or more containerized elements. For instance, a pod may include one or more containers that may be warranted to be co-located and/or executed on a computer system (e.g., a host computer system, host machine, etc.) and may share resources of the computer system. In one or more embodiments, a thick container may be or include a pod, and a thin container may include a single container.

In one or more embodiments, containers may provide and/or offer an immutable quality and/or option. For example, a container may be deployed, destroyed, modified, re-constructed and/or re-created, and re-deployed. In one instance, instructions, executable by a processor, of a container may not be modified while the container is executing. In another instance, instructions, executable by a processor, of a container may not be modified once the container is created.

In one or more embodiments, the term "memory medium" may mean a "memory device", a "memory", a "storage device", a "tangible computer readable storage medium", and/or a "computer-readable medium". In one example, a memory medium may be a volatile memory medium. For instance, the volatile memory medium may lose stored data when the volatile memory medium no longer receives power. In a second example, a memory medium may be a non-volatile memory medium. For instance, the non-volatile memory medium may not lose stored data when the volatile memory medium no longer receives power or when power is not applied. In another example, a memory medium may include a volatile memory medium and a non-volatile memory medium.

In one or more embodiments, a volatile memory medium may include volatile storage. For example, the volatile storage may include random access memory (RAM), dynamic RAM (DRAM), static RAM (SRAM), and/or extended data out RAM (EDO RAM), among others. In one or more embodiments, a non-volatile memory may include non-volatile storage. For example, the non-volatile storage may include read only memory (ROM), programmable ROM (PROM), erasable PROM (EPROM), electrically erasable PROM (EEPROM), a magnetic storage medium (e.g., a hard drive, a floppy disk, a magnetic tape, etc.), ferroelectric RAM (FRAM), flash memory, a solid state drive (SSD), non-volatile RAM (NVRAM), a one-time programmable (OTP) memory, and/or optical storage (e.g., a compact disc (CD), a digital versatile disc (DVD), a BLU-RAY disc (BD), etc.), among others.

In one or more embodiments, I/O subsystem 1500 may include or represent a variety of communication interfaces, graphics interfaces, video interfaces, user input interfaces, and/or peripheral interfaces, among others. For example, I/O subsystem 1500 may include one or more of a touch screen, a display, a display adapter, and a universal serial bus (USB) interface, among others. For instance, a touch screen may include circuitry that enables touch functionality in conjunction with a display that is driven by a display adapter.

In one or more embodiments, network interface 1400 may be configured to be coupled to a network. For example, network interface 1400 may permit computer system 1010 to be communicatively coupled to a network. In one instance, network interface 1400 may be configured to be coupled to a wired network. In a second instance, network interface 1400 may be configured to be coupled to a wireless network. In a second instance, network interface 1400 may be configured to be coupled to an optical network.

In one or more embodiments, one or more of volatile memory medium 1200, non-volatile memory medium 1300, network interface 1400, and I/O subsystem 1500 may be communicatively coupled to processor 1100 via one or more buses. For example, a bus may include one or more of a peripheral component interconnect (PCI) bus, a serial peripheral interface (SPI) bus, an inter-integrated circuit (I²C) bus, an enhanced serial peripheral interface (eSPI) bus, a system management bus (SMBus), a universal serial bus, and a low pin count (LPC) bus, among others. In one or more embodiments, one or more of volatile memory medium 1200, non-volatile memory medium 1300, network interface 1400, and I/O subsystem 1500 may be communicatively coupled to processor 1100 via one or more of a PCI-Express (PCIe) root complex and one or more PCIe switches, among others.

In one or more embodiments, processor 1100 may execute instructions in implementing one or more systems, flowcharts, methods, and/or processes described herein. In one example, processor 1100 may execute processor instructions from one or more of memory media 1200 and 1300 in implementing one or more systems, flowcharts, methods, and/or processes described herein. In another example, processor 1100 may execute instructions received via network interface 1400 in implementing one or more systems, flowcharts, methods, and/or processes described herein.

In one or more embodiments, processor 1100 may include circuitry that may interpret and/or execute program instructions and/or process data, among others. For example, processor 1100 may include one or more of a system, a device, and an apparatus that may interpret and/or execute program instructions and/or process data, among others. For instance, processor 1100 may include one or more of a central processing unit (CPU), a microprocessor, a graphics processing unit (GPU), an application processor, a digital signal processor (DSP), and an application specific integrated circuit (ASIC), among others.

Figure 2:
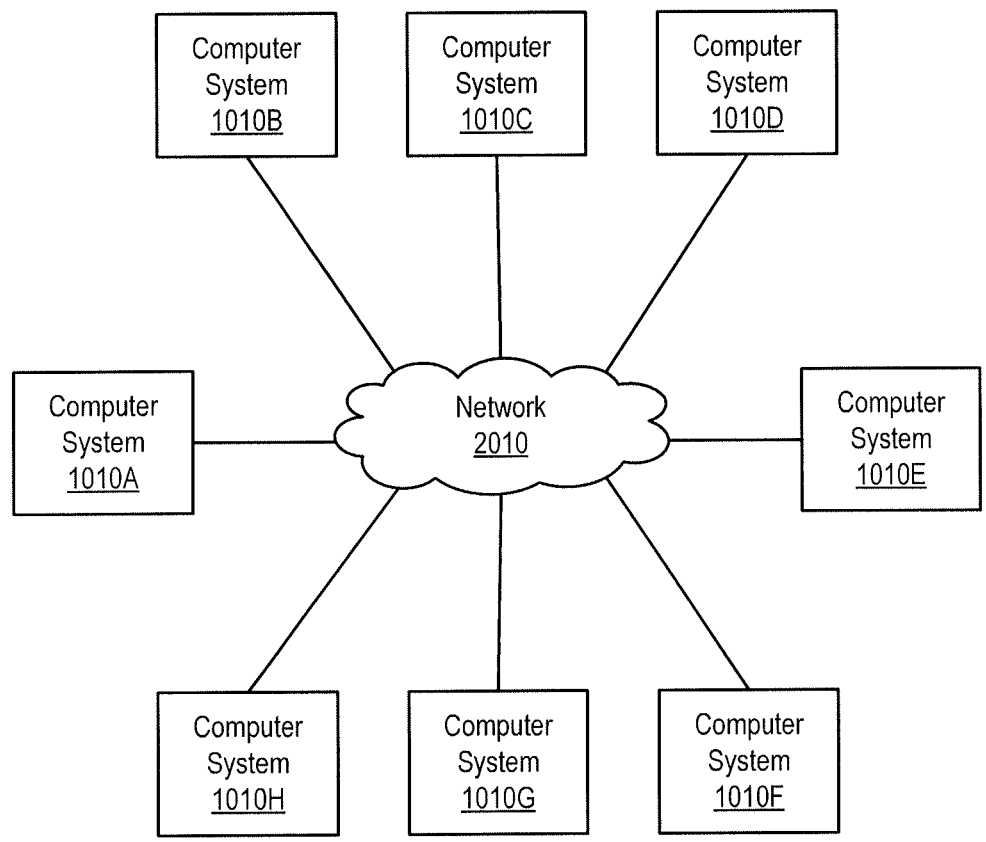
FIG. 2 illustrates example computer systems coupled to a network, according to one or more embodiments.

Turning now to FIG. 2, computer systems coupled to a network are illustrated, according to one or more embodiments. As shown, computer systems 1010A-1010H may be communicatively coupled to a network 2010. In one or more embodiments, network 2010 may include one or more of a wired network, an optical network, and a wireless network. For example, network 2010 may include one or more of a local area network (LAN), a wide area network (WAN), a wireless LAN (WLAN), a metropolitan area network (MAN), a public switched telephone network (PSTN), a public WAN (e.g., an Internet), a private WAN, a cellular telephone network, a satellite telephone network, and a virtual private network (VPN), among others. In one or more embodiments, network 2010 may be coupled to one or more other networks. For example, network 2010 may be coupled to one or more of a LAN, a WAN, a WLAN, a MAN, a PSTN, a public WAN, a private WAN, a cellular telephone network, a satellite telephone network, and a VPN, among others.

Turning now to FIGS. 3A-3D, data sets transferred via data encapsulations are illustrated, according to one or more embodiments. In one or more embodiments, data may be streamed from one or more computer systems to one or more other computer systems. For example, a computer system of computer systems 1010A-1010C may provide a data stream to computer system 1010D, and computer system 1010D may provide the data stream to one or more of computer systems 1010E-1010G. In one or more embodiments, a data stream may include multiple data sets. For example, a data set may include a data structure that includes data of a data stream. In one or more embodiments, multiple data sets may be encapsulated via multiple data encapsulations. In one or more embodiments, a data encapsulation may be provided to a destination computer system as a stream of bits, where the data encapsulation may be de-capsulated to retrieve and/or obtain data that was encapsulated (e.g., retrieve and/or obtain data a data set that was encapsulated). For example, a first computer system may encapsulate a data set via a data encapsulation and provide the data encapsulation to a second computer system, and the second computer system may de-capsulate the data encapsulation to retrieve and/or obtain the data set that was encapsulated. For instance, the first computer system may provide the data encapsulation to the second computer system via a network (e.g., network 2010).

Figure 3A:
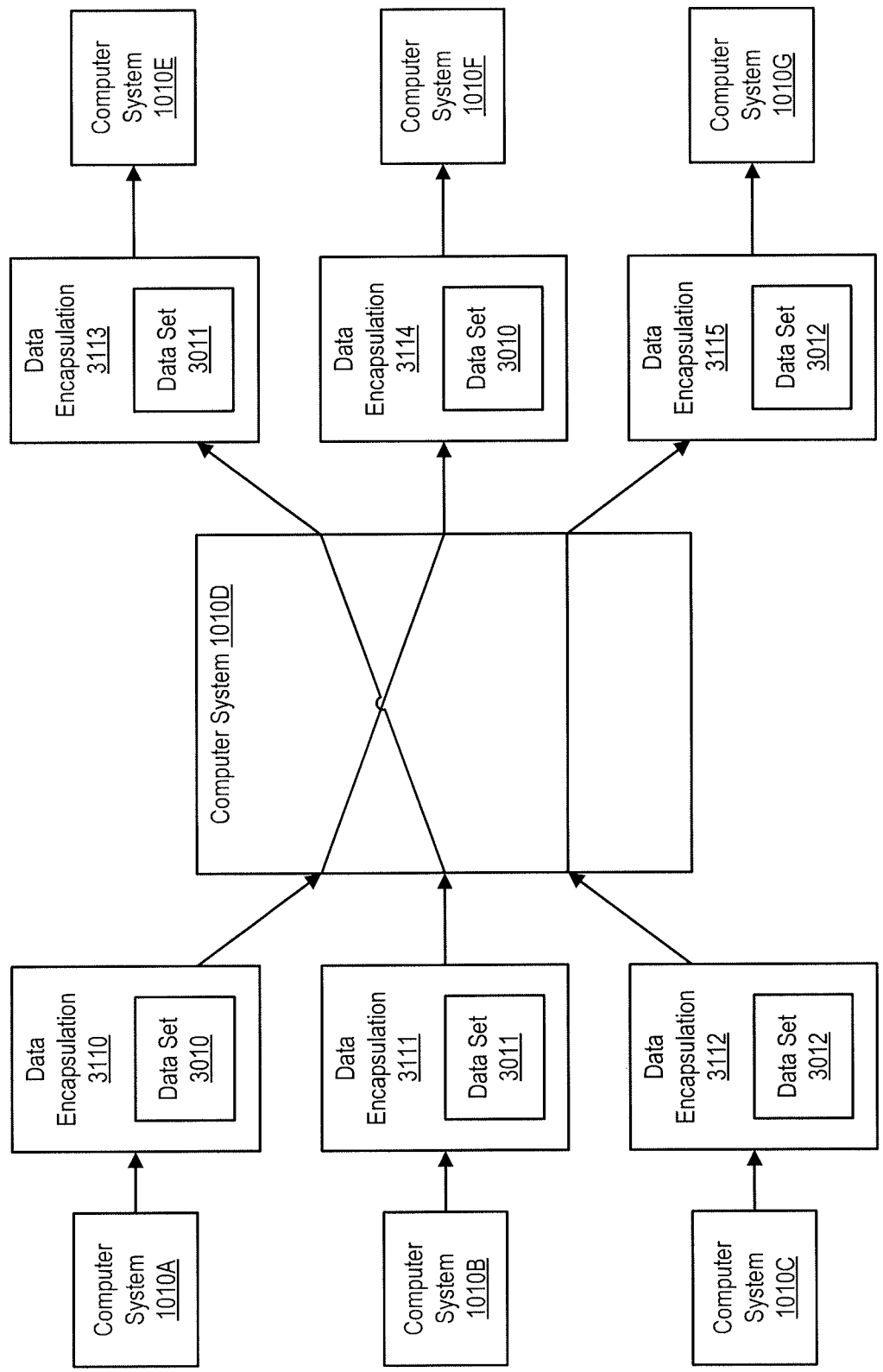
FIGS. 3A-3D illustrate data sets transferred via data encapsulations, according to one or more embodiments.

With reference to FIG. 3A, computer systems 1010A-1010C may provide data encapsulations 3110-3112, respectively, to computer system 1010D. As illustrated, data encapsulations 3110-3112 may respectively include data sets 3010-3012. In one or more embodiments, computer systems 1010A-1010C may publish, respectively, data sets 3010-3012 to computer system 1010D via respective data encapsulations 3110-3112. As shown, computer system 1010D may provide data encapsulations 3113-3115 to computer systems 1010E-1010G, respectively. As illustrated, data encapsulations 3113-3115 may include respective data sets 3011, 3010, and 3012.

In one or more embodiments, one or more computer systems may subscribe to one or more data streams and/or data feeds. For example, a subscription to a data stream and/or data feed may include a computer system receiving data sets of and/or associated with the data stream and/or the data feed. In one or more embodiments, a data set may be encapsulated via a data encapsulation. For example, the data encapsulation may format and/or organize data of the data set. In one instance, the data encapsulation may format and/or organize data of the data set in a format and/or organization that is established and/or expected by a computer system receiving and/or providing the data encapsulation that includes the data set. In another instance, the data encapsulation may format and/or organize data of the data set in a format and/or organization that is utilizable by a computer system receiving and/or providing the data encapsulation that includes the data set.

In one or more embodiments, one or more data encapsulations may be utilized. For example, the one or more data encapsulations may include one or more of a MQ (e.g., IBM MQ) data encapsulation, an Apache Spark data encapsulation, an Apache Kafka data encapsulation, and a custom data encapsulation, among others. In one or more embodiments, a data encapsulation may include or be included in an API. For example, the Apache Spark data encapsulation may provide an API that includes a data structure. For instance, the data structure may include a RDD, which may be or include a read-only multiset of data items that may be distributed via multiple computer systems.

In one or more embodiments, data encapsulations may be pushed to one or more computer systems. For example, computer system 1010D may push data encapsulations 3113-3115 to respective computer systems 1010E-1010G. In one or more embodiments, one or more computer systems may request one or more data encapsulations, and the one or more data encapsulations may be provided to the one or more computer systems after the one or more computer systems request the one or more data encapsulations. For example, one or more of computer systems 1010E-1010G may request one or more data encapsulation from computer system 1010D, and computer system 1010D may provide data encapsulations 3113-3115 to respective computer systems 1010E-1010G, after receiving one or more requests from computer systems 1010E-1010G.

Figure 3B:
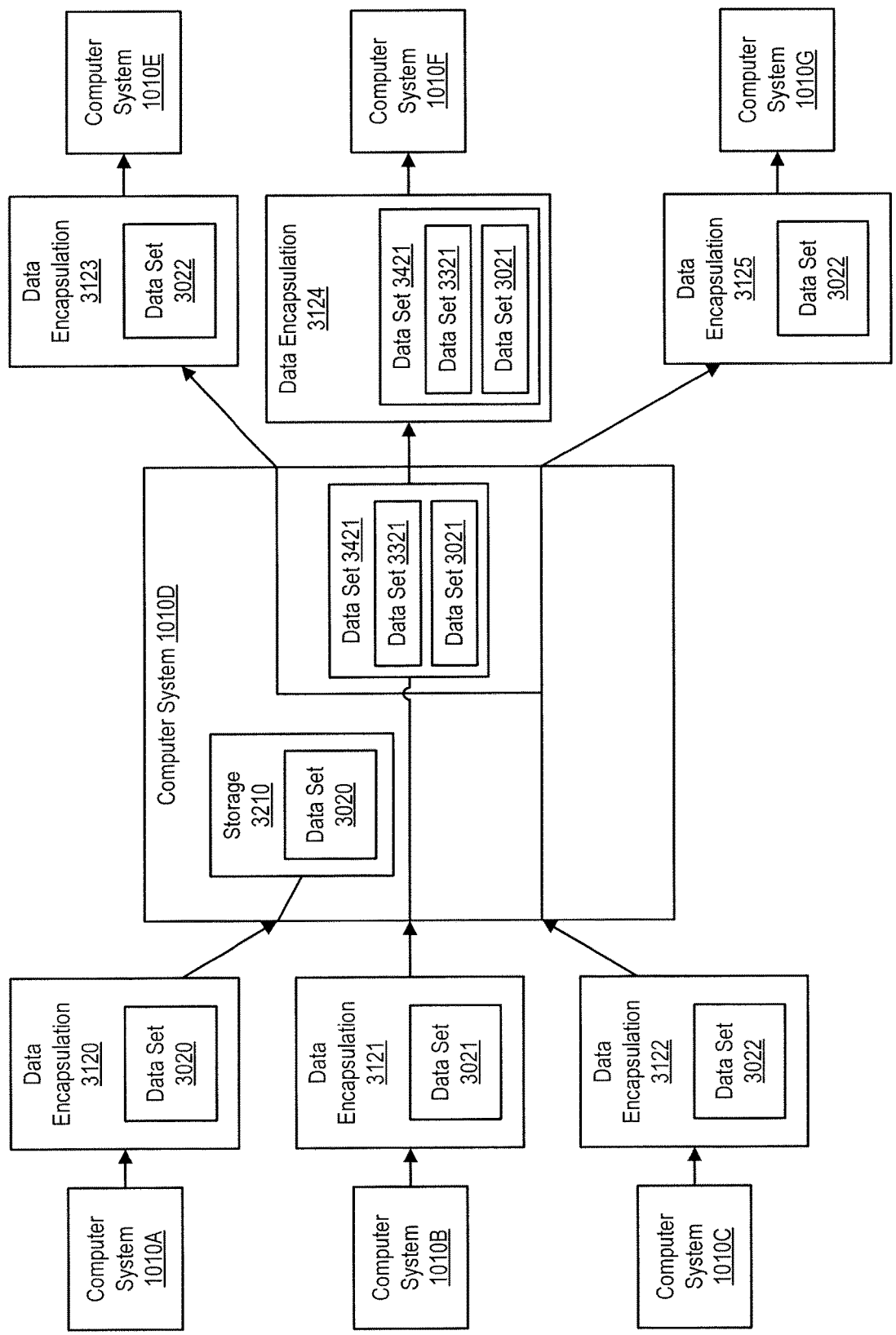

With reference to FIG. 3B, computer systems 1010A-1010C may provide data sets 3020-3022 to computer system 1010D via data encapsulations 3120-3122. In one or more embodiments, providing data to a computer system may be or include publishing data to the computer system. As illustrated, computer system 1010D may store data set 3020 via a storage 3210. For example, storage 3210 may be or include a memory medium that may store data. For instance, the memory medium may include a buffer that includes and/or stores data set 3020. In one or more embodiments, storage 3210 may cache one or more data sets. For example, storage 3210 may cache one or more data sets until a subscriber (e.g., a computer system) may retrieve and/or receive the one or more data sets. In one or more embodiments, storage 3210 may be configured to store data sets for any period of time and/or may be configured to store any amount of data and/or any number of data sets. In one or more embodiments, a subscriber computer system may not be functioning and/or may not be communicatively coupled to computer system 1010D, and storage 3210 may store one or more data sets until the one or more data sets can be provided to and/or received by the subscriber computer system. In one example, the subscriber computer system may be "down". In another example, a network outage (e.g., a problem and/or issue with one or more communications systems and/or networks, etc.) may prevent the subscriber computer system from communicating with computer system 1010D.

As shown, computer system 1010D may enhance data set 3021. For example, computer system 1010D may enhance data set 3021 with a data set 3321. For instance a data set 3421 may be or include data sets 3021 and 3321. In one or more embodiments, enhancing a data set may include tagging and/or identifying the data set with additional data. For example, data set 3321 may be or include an identification (ID). As shown, computer system 1010D may provide data set 3421 to computer system 1010F via a data encapsulation 3124. As illustrated, a data set may be provided to multiple computer systems. For example, computer system 1010D may duplicate one or more data sets and may provide the one or more data sets to one or more computer systems. For instance, computer system 1010D may duplicate data set 3022 and may provide data set 3022 to computer systems 1010E and 1010G via respective data encapsulations 3123 and 3125. In one or more embodiments, data encapsulations 3123 and 3125 may encapsulate data set 3022 differently.

Figure 3C:
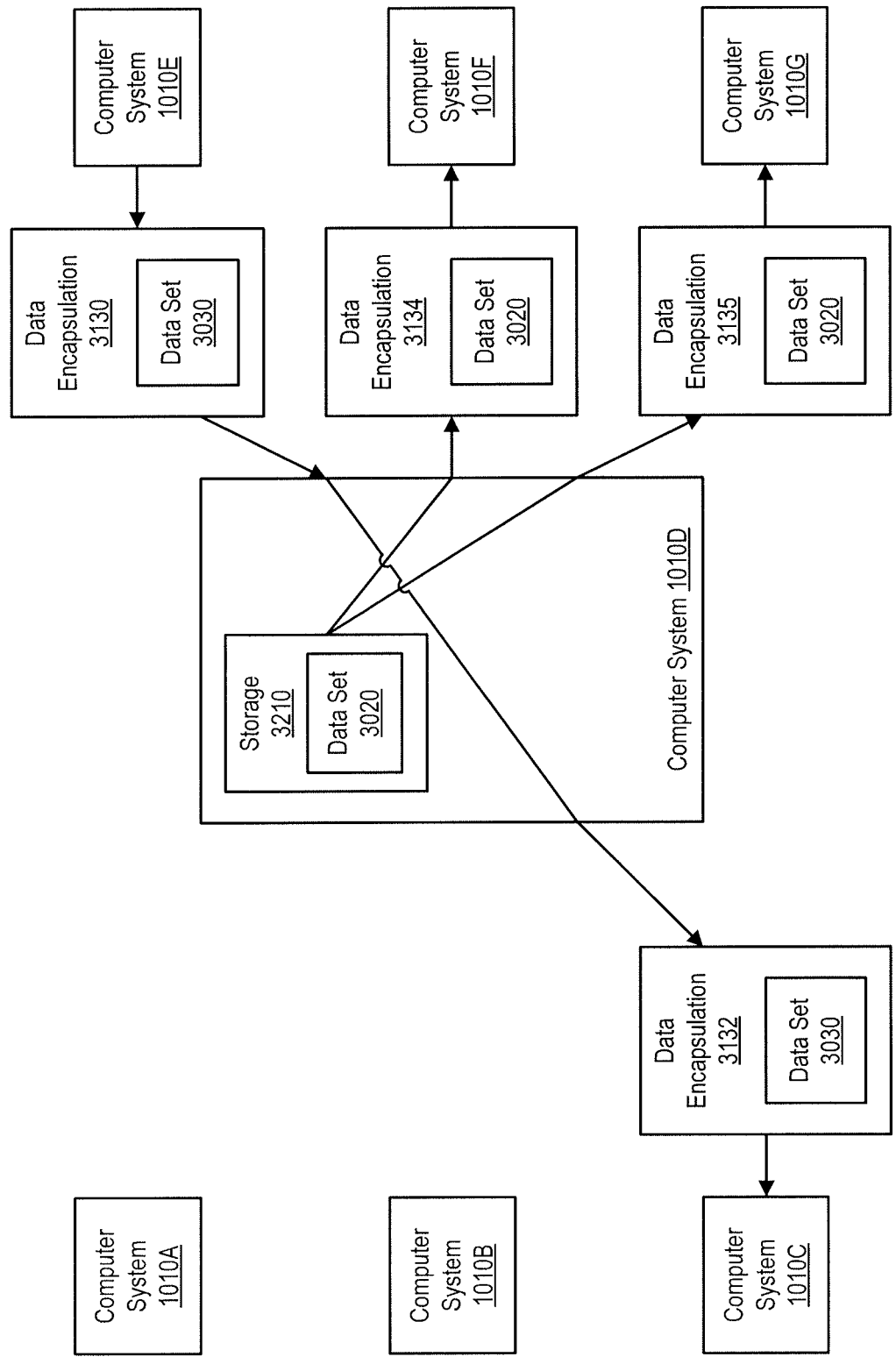

With reference to FIG. 3C, computer system 1010D may provide data set 3020 to computer system 1010F via a data encapsulation 3134. For example, computer system 1010D may retrieve data set 3020 from storage 3210. As shown, computer system 1010D may duplicate and provide data set 3020 to computer system 1010G via a data encapsulation 3135.

In one or more embodiments, one or more computer systems may provide data sets and receive data sets. For example, one or more computer systems may publish data sets and subscribe to data sets. In one instance, computer system 1010E may subscribe to data sets and publish data sets. In another instance, computer system 1010C may subscribe to data sets and publish data sets. As illustrated, computer system 1010E may provide a data set 3030 to computer system 1010D via data encapsulation 3130, and computer system 1010D may provide data set 3030 to computer system 1010C via data encapsulation 3132.

Figure 3D:
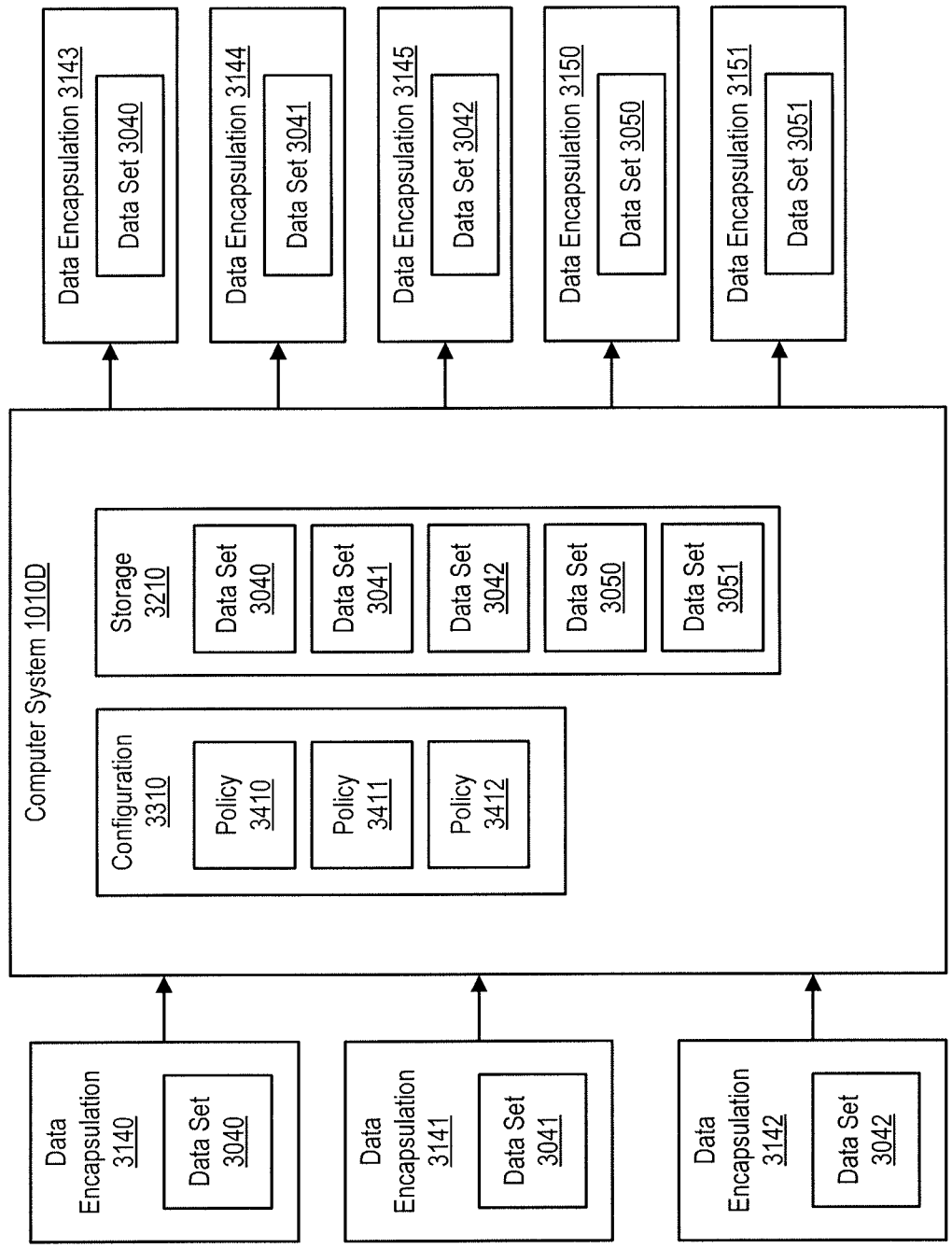

With reference to FIG. 3D, computer system 1010D may receive data sets 3040-3042 via respective data encapsulations 3140-3142. For example, computer system 1010D may receive data sets 3040-3042 via respective data encapsulations 3140-3142 from one or more of computer systems 1010A-1010C and 1010E-1010G.

As illustrated, computer system 1010D may include a configuration 3310. In one or more embodiments, configuration 3310 may include policies. As shown, configuration 3310 may include policies 3410-3412. In one or more embodiments, a policy may configure computer system 1010D to interrogate one or more data streams. For example, a policy may configure computer system 1010D to interrogate one or more data sets. For instance, computer system 1010D to interrogate one or more data sets, based at least on one or more of policies 3410-412, and may determine if a data set is defective and/or faulty. If the data set is defective and/or faulty, the data set may be stored. In one example, a data set 3040 may be stored via storage 3210. In another example, a new data set may be created and/or modified. In one instance, a data set 3050 may include a counter, and the counter may be incremented, based at least on determining that one or more of policies 3410-3412 has been satisfied by a data set. In another instance, data set 3050 may created if it does not already exist when one or more of policies 3410-3412 have been satisfied by a data set.

In one or more embodiments, a data set may be created in response to determining an alert condition. For example, computer system 1010D may determine an alert condition based at least on one or more of policies 3410-3412. For instance, computer system 1010D may determine fraudulent behavior and/or fraudulent data from interrogating one or more data sets, based at least on one or more of policies 3410-3412, and may create data set 3051 based on determining the alert condition of the fraudulent behavior and/or the fraudulent data. In one or more embodiments, one or more of policies 3410-3412 may be based at least on one or more needs of one or more data providers, one or more data consumers, and data integrity, among others. In one example, the one or more data providers may include one or more of computer systems 1010A-1010C and 1010E. In another example, the one or more data consumers may include one or more of computer systems 1010C and 1010E-1010G.

In one or more embodiments, a data set may be created in response to satisfying a policy. For example, the data set may be created and may be provided to a computer system, and the computer system may perform an action based at least on the data set. For instance, computer system 1010D may create data set 3051 and may provide data set to one or more of computer systems 1010A-1010C and 1010E-1010G, and one or more of computer systems 1010A-1010C and 1010E-1010G may perform an action based at least on data set 3051. In another example, interrogating data set 3041 may determine that policy 3411 is satisfied, where policy 3411 may be utilized in creating data set 3051 that indicates that a user is exploring home mortgages. For instance, a computer system of computer systems 1010A-1010C and 1010E-1010G may receive data set 3051 and, based at least on data set 3051, may provide the user with an advertisement and/or a promotion for a home appliance (e.g., a refrigerator, a washing machine, a disk washer, etc.).

In one or more embodiments, one or more data sets may be stored for a period of time before being provided to one or more computer systems. For example, one or more of data sets 3040-3042, 3050, and 3051 may be stored via storage 3210 before being provided to one or more of computer systems 1010A-1010C and 1010E-1010G. For instance, one or more of data sets 3040-3042, 3050, and 3051 may be stored until retrieved by one or more of computer systems 1010A-1010C and 1010E-1010G.

Figure 4:
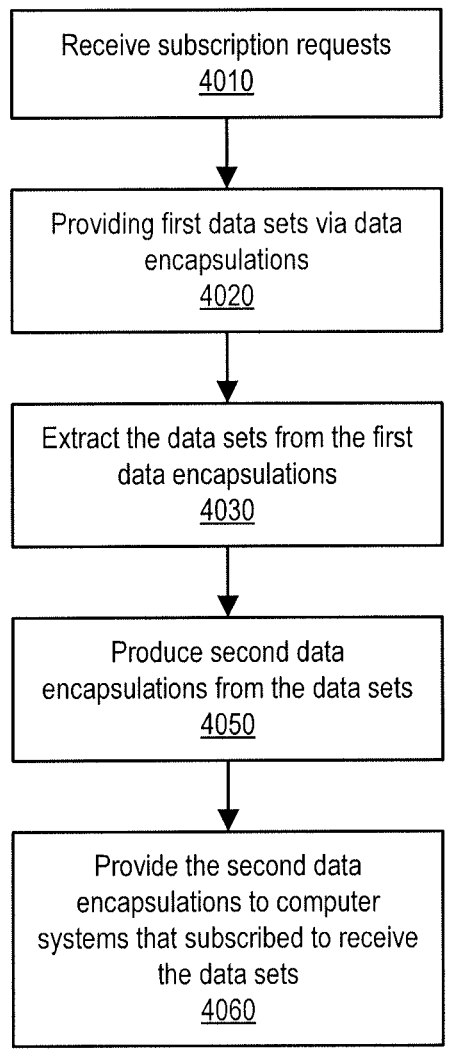
FIG. 4 illustrates a method of operating computer systems, according to one or more embodiments.

Turning now to FIG. 4, a method of operating computer systems is illustrated, according to one or more embodiments. At 4010, subscription requests may be received. In one example, subscription requests may be received from one or more of computer systems 1010E-1010G. In another example, a subscription request may be received from computer system 1010C. In one or more embodiments, a subscription request may be or include a request for data sets. For example, the subscription request may include a request for data sets via a data encapsulation. For instance, the data encapsulation may include a MQ (e.g., IBM MQ) data encapsulation, an Apache Spark data encapsulation, an Apache Kafka data encapsulation, or a custom data encapsulation, among others.

At 4020, data sets may be provided via first data encapsulations. In one example, computer systems 1010A-1010C may provide respective data sets 3010-3012 via respective data encapsulations 3110-3112 to computer systems 1010D. In another example, data sets 3010-3012 may be provided to computer system 1010D via data encapsulations 3110-3112. In one or more embodiments, two or more data encapsulations may be different data encapsulations. For example, data encapsulation 3110 may be or include a MQ (e.g., IBM MQ) data encapsulation, data encapsulation 3111 may be or include an Apache Spark data encapsulation, and data encapsulation 3112 may be or include an Apache Kafka data encapsulation.

At 4030, the first data sets may be obtained from the first data encapsulations. For example, computer system 1010D may obtain data sets from respective data encapsulations. In one instance, computer system 1010D may obtain data sets 3010-3012 from respective data encapsulations 3110-3112. In a second instance, computer system 1010D may obtain data sets 3040-3042 from respective data encapsulations 3140-3142.

At 4040, second data encapsulations that include the data sets may be produced. In one example, computer system 1010D may produce data encapsulations 3113-3115 that include respective data sets 3011, 3010, and 3012. In another example, computer system 1010D may produce data encapsulations 3143-3145 that include respective data sets 3040-3042. In one or more embodiments, two or more data encapsulations may be different data encapsulations. For example, data encapsulation 3113 may be or include an Apache Kafka data encapsulation, data encapsulation 3114 may be or include a custom data encapsulation, and data encapsulation 3115 may be or include a MQ (e.g., IBM MQ) data encapsulation.

At 4050, the second data encapsulations that include the data sets may be provided to computer systems that subscribed to receive the data sets. In one example, computer systems 1010E-1010G may have subscribed to receive the data sets. For instance, computer system 1010D may provide data encapsulations 3113-3115, that include respective data sets 3011, 3010, and 3012, to computer systems 1010E-1010G, respectively. In another example, one or more of 1010C and 1010E-1010G may have subscribed to receive the data sets. For instance, computer system 1010D may provide data encapsulations 3143-3145, that include respective data sets 3040-3042, to one or more of computer systems 1010C and 1010E-1010G. In one or more embodiments, requests for the data sets may be received from the computer systems that subscribed to receive the data sets. For example, the requests for the data sets may be received from the computer systems that subscribed to receive the data sets before the second data encapsulations that include the data sets may be provided the computer systems that subscribed to receive the data sets.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system, comprising:
   one or more processors;
   a memory medium, coupled to the one or more processors;
   wherein the memory medium stores instructions that are executable by the one or more processors and that when executed by the one or more processors, cause the system to:
      receive, from a first plurality of computer systems, a plurality of data sets via a first plurality of different data encapsulations, wherein the first plurality of different data encapsulations comprises translating the plurality of data sets into a first data format and controlling routing of the plurality of data sets to the system;
      obtain the plurality of data sets from the first plurality of different data encapsulations;
      receive, from a second plurality of computer systems, requests to provide the plurality of data sets with a second plurality of different data encapsulations to the second plurality of computer systems, wherein the second plurality of different data encapsulations comprises translating the plurality of data sets into a second data format and controlling routing of the plurality of data sets to the second plurality of computer systems;
      in response to receiving the requests from the second plurality of computer systems, determine whether there is fraudulent behavior associated with the plurality of data sets by interrogating the plurality of data sets based at least in part upon one or more policies comprising needs of at least one computer system from the first plurality of computer systems and needs of at least one computer system from the second plurality of computer;
      if the one or more policies are not satisfied, determine that there is fraudulent behavior associated with the plurality of data sets;
      in response to determining that there is fraudulent behavior associated with the plurality of data sets;
         store the plurality of data sets; and
         utilize the policies to generate a new plurality of data sets from the plurality data sets that satisfies the policies, such that the new plurality of data sets is different from the stored plurality of data sets that is determined to be associated with fraudulent behavior;
      produce the second plurality of different data encapsulations that include the new plurality of data sets; and
      provide the second plurality of different data encapsulations that include the new plurality of data sets to the second plurality of computer systems that subscribed to receive the plurality of data sets with the second plurality of different data encapsulations, wherein:
         the second plurality of different data encapsulations is determined by the second plurality of computer systems; and
         each of the first plurality of computer system and the second plurality of computer systems is capable of publishing the plurality of data sets and subscribing to receive the plurality of data sets.

2. The system of claim 1, wherein the memory medium further stores instructions that are executable by the one or more processors and that when executed by the one or more processors, cause the system to further:
store at least two of the new plurality of data sets; and
wherein, to provide the second plurality of different data encapsulations that include the new plurality of data sets to the second plurality of computer systems that subscribed to receive the plurality of data sets, the memory medium further stores instructions that are executable by the one or more processors and that when executed by the one or more processors, cause the system to further:
provide the at least two of the new plurality of data sets to at least one of the second plurality of computer systems after an amount of time transpires.

3. The system of claim 1, wherein at least one of the second plurality of different data encapsulations includes a duplicated data set.

4. The system of claim 3, wherein the memory medium further stores instructions that are executable by the one or more processors and that when executed by the one or more processors, cause the system to further:
duplicate at least one of the new plurality of data sets.

5. The system of claim 4, wherein, to produce the second plurality of different data encapsulations that include the new plurality of data sets, the memory medium further stores instructions that are executable by the one or more processors and that when executed by the one or more processors, cause the system to further:
produce a first data encapsulation of the second plurality of different data encapsulations that includes the at least one of the new plurality of data sets; and
produce a second data encapsulation, different from the first data encapsulation, of the second plurality of different data encapsulations that includes the duplicated data set.

6. The system of claim 5, wherein, to provide the second plurality of different data encapsulations that include the new plurality of data sets to the second plurality of computer systems, the memory medium further stores instructions that are executable by the one or more processors and that when executed by the one or more processors, cause the system to further:
provide the first data encapsulation of the second plurality of different data encapsulations that includes the at least one of the new plurality of data sets to a first computer system of the second plurality of computer systems; and
provide the second data encapsulation, different from the first data encapsulation, of the second plurality of different data encapsulations that includes the duplicated data set.

7. The system of claim 1, wherein the memory medium further stores instructions that are executable by the one or more processors and that when executed by the one or more processors, cause the system to further:
receive at least one request from at least one of the second plurality of computer systems.

8. A method, comprising:
receiving, from a first plurality of computer systems, a plurality of data sets via a first plurality of different data encapsulations, wherein the first plurality of different data encapsulations comprises translating the plurality of data sets into a first data format and controlling routing of the plurality of data sets to the system;
obtaining the plurality of data sets from the first plurality of different data encapsulations;
receiving, from a second plurality of computer systems, requests to provide the plurality of data sets with a second plurality of different data encapsulations to the second plurality of computer systems, wherein the second plurality of different data encapsulations comprises translating the plurality of data sets into a second data format and controlling routing of the plurality of data sets to the second plurality of computer systems;
in response to receiving the requests from the second plurality of computer systems, determining whether there is fraudulent behavior associated with the plurality of data sets by interrogating the plurality of data sets based at least in part upon one or more policies comprising needs of at least one computer system from the first plurality of computer systems and needs of at least one computer system from the second plurality of computer systems;
if the one or more policies are not satisfied, determining that there is fraudulent behavior associated with the plurality of data sets;
in response to determining that there is fraudulent behavior associated with the plurality of data sets:
storing the plurality of data sets; and
utilizing the policies to generate a new plurality of data sets from the plurality data sets that satisfies the policies, such that the new plurality of data sets is different from the stored plurality of data sets that is determined to be associated with fraudulent behavior;
producing the second plurality of different data encapsulations that include the new plurality of data sets; and
providing the second plurality of different data encapsulations that include the new plurality of data sets to the second plurality of computer systems that subscribed to receive the plurality of data sets with the second plurality of different data encapsulations, wherein:
the second plurality of different data encapsulations is determined by the second plurality of computer systems; and
each of the first plurality of computer system and the second plurality of computer systems is capable of publishing the plurality of data sets and subscribing to receive the plurality of data sets.

9. The method of claim 8, further comprising:
storing at least two of the new plurality of data sets;
wherein the providing the second plurality of different data encapsulations that include the new plurality of data sets to the second plurality of computer systems that subscribed to receive the plurality of data sets includes providing the at least two of the new plurality of data sets to at least one of the second plurality of computer systems after an amount of time transpires.

10. The method of claim 8, wherein at least one of the second plurality of different data encapsulations includes a duplicated data set.

11. The method of claim 10, further comprising:
duplicating at least one of the new plurality of data sets.

12. The method of claim 11, wherein the producing the second plurality of different data encapsulations that include the new plurality of data sets includes:
producing a first data encapsulation of the second plurality of different data encapsulations that includes the at least one of the new plurality of data sets; and producing a second data encapsulation, different from the first data encapsulation, of the second plurality of different data encapsulations that includes the duplicated data set.

13. The method of claim 12, wherein the providing the second plurality of different data encapsulations that include the new plurality of data sets to the second plurality of computer systems includes:
providing the first data encapsulation of the second plurality of different data encapsulations that includes the at least one of the new plurality of data sets to a first computer system of the second plurality of computer systems; and
providing the second data encapsulation, different from the first data encapsulation, of the second plurality of different data encapsulations that includes the duplicated data set.

14. The method of claim 8, further comprising:
receiving at least one request from at least one of the second plurality of computer systems.

15. A computer-readable non-transitory memory medium that comprises instructions executable by one or more processors of a system and that when the one or more processors executes the instructions, cause the system to:
receive, from a first plurality of computer systems, a plurality of data sets via a first plurality of different data encapsulations, wherein the first plurality of different data encapsulations comprises translating the plurality of data sets into a first data format and controlling routing of the plurality of data sets to the system;
obtain the plurality of data sets from the first plurality of different data encapsulations;
receive, from a second plurality of computer systems, requests to provide the plurality of data sets with a second plurality of different data encapsulations to the second plurality of computer systems, wherein the second plurality of different data encapsulations comprises translating the plurality of data sets into a second data format that and controlling routing of the plurality of data sets to the second plurality of computer systems;
in response to receiving the requests from the second plurality of computer systems, determine whether there is fraudulent behavior associated with the plurality of data sets by interrogating the plurality of data sets based at least in part upon one or more policies comprising needs of at least one computer system from the first plurality of computer systems and needs of at least one computer system from the second plurality of computer systems;
if the one or more policies are not satisfied, determine that there is fraudulent behavior associated with the plurality of data sets;
in response to determining that there is fraudulent behavior associated with the plurality of data sets:
store the plurality of data sets; and
utilize the policies to generate a new plurality of data sets from the plurality data sets that satisfies the policies, such that the new plurality of data sets is different from the stored plurality of data sets that is determined to be associated with fraudulent behavior;
produce the second plurality of different data encapsulations that include the new plurality of data sets; and
provide the second plurality of different data encapsulations that include the new plurality of data sets to the second plurality of computer systems that subscribed to receive the plurality of data sets with the second plurality of different data encapsulations, wherein:
the second plurality of different data encapsulations is determined by the second plurality of computer systems; and
each of the first plurality of computer system and the second plurality of computer systems is capable of publishing the plurality of data sets and subscribing to receive the plurality of data sets.

16. The computer-readable non-transitory memory medium of claim 15,
wherein the computer-readable non-transitory memory medium further stores instructions that are executable by the one or more processors and that when executed by the one or more processors, cause the system to further:
store at least two of the new plurality of data sets; and
wherein, to provide the second plurality of different data encapsulations that include the new plurality of data sets to the second plurality of computer systems that subscribed to receive the plurality of data sets, the computer-readable non-transitory memory medium further stores instructions that are executable by the one or more processors and that when executed by the one or more processors, cause the system to further:
provide the at least two of the new plurality of data sets to at least one of the second plurality of computer systems after an amount of time transpires.

17. The computer-readable non-transitory memory medium of claim 15, wherein at least one of the second plurality of different data encapsulations includes a duplicated data set.

18. The computer-readable non-transitory memory medium of claim 17, wherein the computer-readable non-transitory memory medium further stores instructions that are executable by the one or more processors and that when executed by the one or more processors, cause the system to further:
duplicate at least one of the new plurality of data sets.

19. The computer-readable non-transitory memory medium of claim 18, wherein, to produce the second plurality of different data encapsulations that include the new plurality of data sets, the computer-readable non-transitory memory medium further stores instructions that are executable by the one or more processors and that when executed by the one or more processors, cause the system to further:
produce a first data encapsulation of the second plurality of different data encapsulations that includes the at least one of the new plurality of data sets; and
produce a second data encapsulation, different from the first data encapsulation, of the second plurality of different data encapsulations that includes the duplicated data set.

20. The computer-readable non-transitory memory medium of claim 19, wherein, to provide the second plurality of different data encapsulations that include the new plurality of data sets to the second plurality of computer systems, the computer-readable non-transitory memory medium further stores instructions that are executable by the one or more processors and that when executed by the one or more processors, cause the system to further:
provide the first data encapsulation of the second plurality of different data encapsulations that includes the at least one of the new plurality of data sets to a first computer system of the second plurality of computer systems; and provide the second data encapsulation, different from the first data encapsulation, of the second plurality of different data encapsulations that includes the duplicated data set.

* * * * *